(12) United States Patent
Anderson

(10) Patent No.: US 7,346,546 B2
(45) Date of Patent: Mar. 18, 2008

(54) PURCHASING INTERFACE WITH A TASK DISPLAY

(75) Inventor: Glen J. Anderson, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 563 days.

(21) Appl. No.: 09/876,577

(22) Filed: Jun. 7, 2001

(65) Prior Publication Data
US 2002/0188519 A1     Dec. 12, 2002

(51) Int. Cl.
*G06Q 30/00*     (2006.01)

(52) U.S. Cl. .................. 705/26; 705/27; 705/36 R; 709/219; 709/223; 709/224; 715/501.1

(58) Field of Classification Search ............ 705/26, 705/27; 709/219, 223, 224; 715/501.1
See application file for complete search history.

(56) References Cited

U.S. PATENT DOCUMENTS

| | | | |
|---|---|---|---|
| 5,875,110 A | | 2/1999 | Jacobs ............... 364/479.02 |
| 5,933,841 A | * | 8/1999 | Schumacher et al. .... 715/501.1 |
| 6,012,044 A | | 1/2000 | Maggioncalda et al. ...... 705/36 |
| 6,021,397 A | | 2/2000 | Jones et al. ................. 705/36 |
| 6,101,486 A | * | 8/2000 | Roberts et al. .............. 705/27 |
| 6,105,063 A | * | 8/2000 | Hayes, Jr. .................. 709/223 |
| 6,125,355 A | | 9/2000 | Bekaert et al. .............. 705/36 |
| 6,167,383 A | * | 12/2000 | Henson ..................... 705/26 |
| 6,230,199 B1 | * | 5/2001 | Revashetti et al. .......... 709/224 |
| 6,236,978 B1 | * | 5/2001 | Tuzhilin .................... 705/26 |
| 6,578,013 B1 | * | 6/2003 | Davis et al. ................. 705/26 |
| 6,725,257 B1 | * | 4/2004 | Cansler et al. .............. 709/219 |

FOREIGN PATENT DOCUMENTS

EP      0 803 808 A2  * 10/1997

OTHER PUBLICATIONS

Press release; " Dell Begins Shipping SellNet by MSN"; PR Newswire; New York; Nov. 29, 2000, p. 1, extracted on Internet from Proquest database on Aug. 11, 2004.*
Shopping Guide; http://www.ford.com/servlet/ecm.../index.jsp?SECTION=ourVehicles&LEVEL2=shoppingGuid.
Listings Search; http://www.homelandrealty.com/search.cfm.
Symantec's Q&A gains DAVE, GUI. (Q&A 4.0 for Windows database and word-processing software combination; Do Anything Very Easily help facility, graphical user inerface) (Software Review) (Lab Notes) (PC Week LABS: First Looks) (Evaluation); www.nerac.com.
Gateway Essential 800c; http://www.necxdirect.com/hai/relay_action.html; May 2, 2001.

* cited by examiner

*Primary Examiner*—Yogesh C. Garg
(74) *Attorney, Agent, or Firm*—Jeffrey A. Proehl; Woods Fuller Shultz & Smith

(57) ABSTRACT

The present invention discloses a system and method of providing instruction and support for a user regarding components and products of a multi-component system. A browsing interface may provide a means for providing instruction and support with regards to component and product selection. A relational database may store information on each available component and product for a multi-component system. Another advantage of the invention is the ability to develop a personal history file, thus providing customized support for each individual user in the selection of products and components.

30 Claims, 8 Drawing Sheets

PURCHASING INTERFACE WITH A TASK DISPLAY

FIELD OF THE INVENTION

The present invention relates generally to a graphical user interface and more specifically to a browsing interface for assisting users in the selection of configuration choices of multi-component systems.

BACKGROUND OF THE INVENTION

In the sale of multi-component systems and related products, a large group of consumers rarely select a similar type of configuration. Examples of multi-component systems may include computer systems, automobiles, stereos, security systems and the like. During the purchase of these types of products, individuals tend to vary on the selection of options and features they desire. For example, individual consumers have unique tastes and different budgets when purchasing a multi-component system.

It is becoming evermore popular to research and purchase systems online at a retailer's web site. For example, a retailer may offer available components of a system which can be selected by a user. Upon the completion of a user's selections, an order may be accomplished and delivered to a retailer. Upon receipt of the order, a retailer may manufacture the system which will include the components and features selected by the user. In large and highly technological systems, it is often difficult for a user to decide which components he or she would like in his or her system. For example, a user may not know which type of engine to select for an automobile.

SUMMARY OF THE INVENTION

Accordingly, the present invention is directed to a system and method of providing instruction and support for a user regarding components and products of a multi-component system. A browsing interface may be supplied to a user to provide a means for providing instruction and support with regard to component and product selection. Included within the browsing interface of the present invention, a relational database may store information on each available component and product for a multi-component system. The browsing interface may also be capable of developing a personal history file for each individual user, and thus provide customized support to each individual user.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made to a presently preferred embodiment of the invention, an example of which is illustrated in the accompanying drawings.

Figure 1:
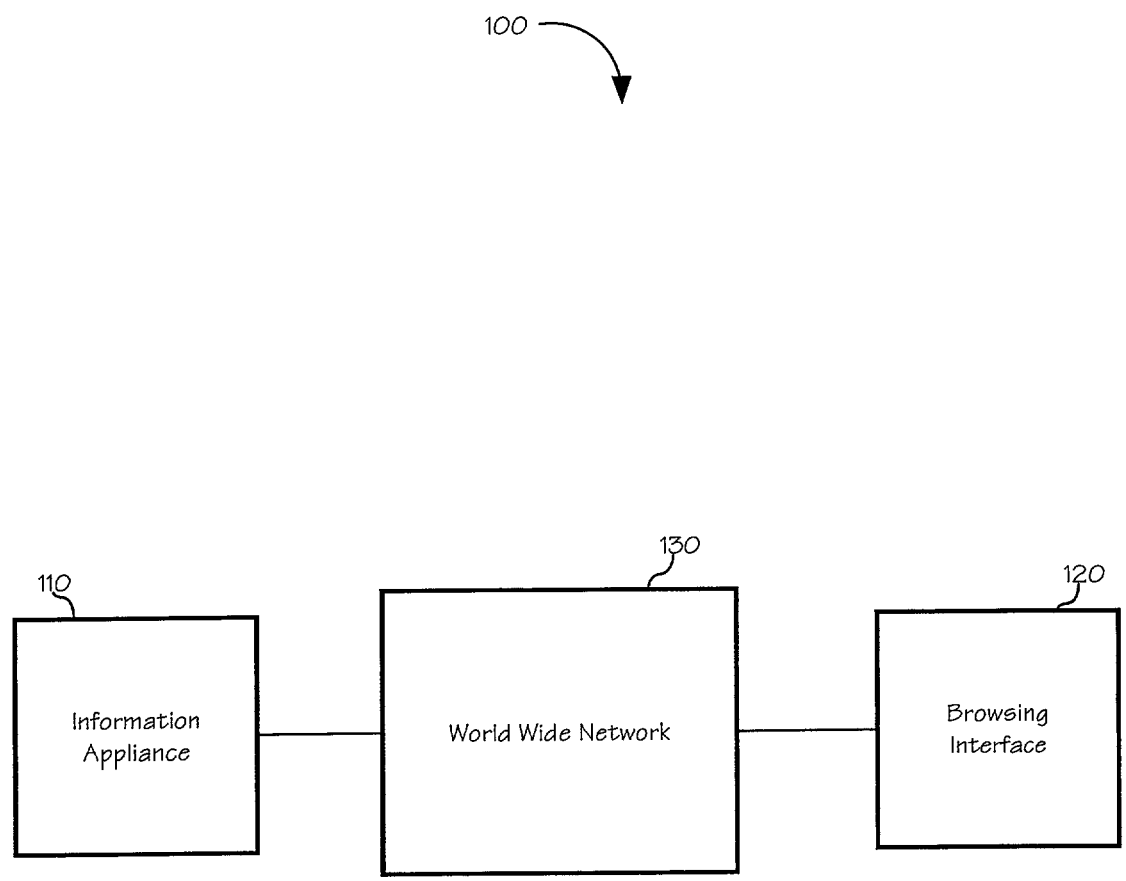
FIG. 1 depicts an embodiment of a system for gaining access to a browsing interface of the present invention.

Referring to FIG. 1, an embodiment of a system 100 for gaining access to a browsing interface of the present invention is shown. A browsing interface 120 may be capable of providing instruction and support to a user regarding configuration choices of a multi-component system. Configuration choices of may include components, products, and features of a system configuration. Browsing interface 120 may include an interactive user display with a relational database which maintains a list of available components and cross-referencing information for combinations of components and products. For example, the relational database may include information regarding each product, information regarding the interaction of products, and suggestions for other products. Further, the relational database may provide a description of a function capable of being implemented with a system configuration selection.

A user may utilize an information appliance 110 which may be capable of accessing a world wide network 130. Access to browsing interface 120 may be accomplished via a world wide network 130. For example, browsing interface 120 may be a web site maintained on a world wide network. In an embodiment of the invention, the world wide network 130 may be the Internet and may include the World Wide Web while the browsing interface 120 may be a web site maintained on the Internet. An information appliance 110 may include any device capable of gaining access to the Internet such as a personal computer, personal digital assistant, cellular phone, web television, and the like.

Figure 2:
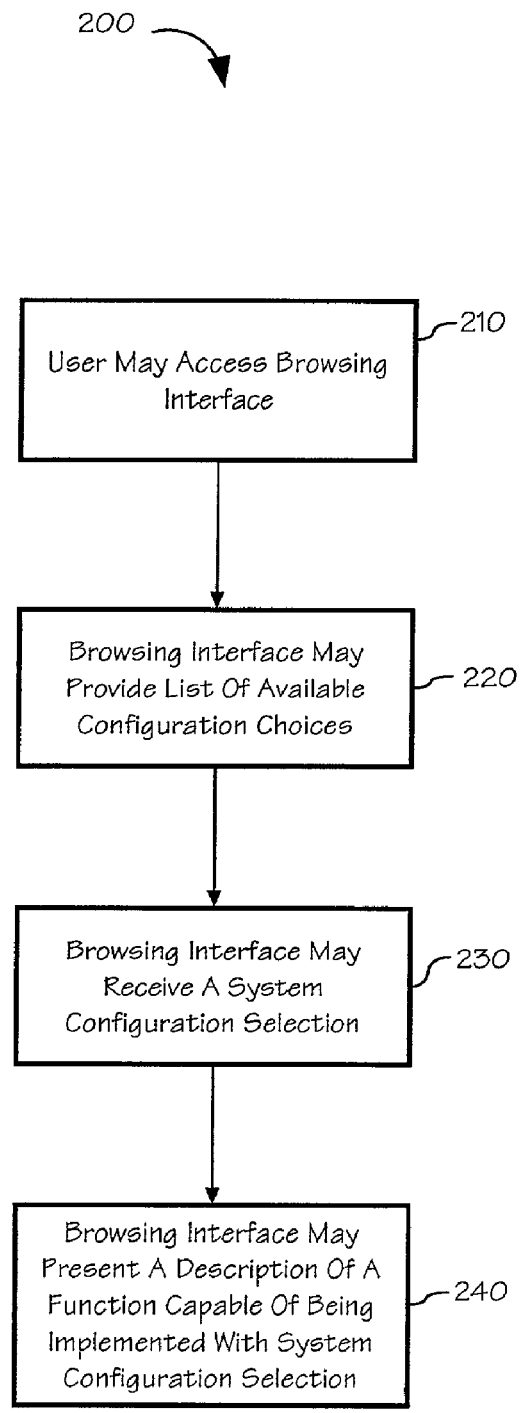
FIG. 2 depicts an embodiment of a process of the present invention for aiding a user in the selection of products and features.

Referring now to FIG. 2, an embodiment of a process 200 for aiding a user in the selection of components and products regarding a multi-component system is shown. A user may begin by gaining access to the browsing interface 210. Access to the database may be achieved by utilization of the system 100 as described in FIG. 1. The browsing interface may provide a list of available configuration choices 220. The list of configuration choices may include available system elements with which a build-to-order system may be configured.

The browsing interface of the present invention may receive a system configuration selection based on a combination of system elements selected from the list of configuration choices 230. The relational database of the present invention may analyze the system configuration selection and provide a description of a function capable of being implemented with the system configuration selection 240.

The information presented may include a description of a function capable of being implemented by each component.

In an alternative embodiment, the process 200 for aiding a user in the selection of products and features for a multi-component system may further include receiving an updated system configuration selection. Upon learning about a first selection, a user may desire other features. Thus, the system of the present invention may accept multiple choices and provide an updated description of a function capable of being implemented with the updated system configuration selection.

Figure 3:
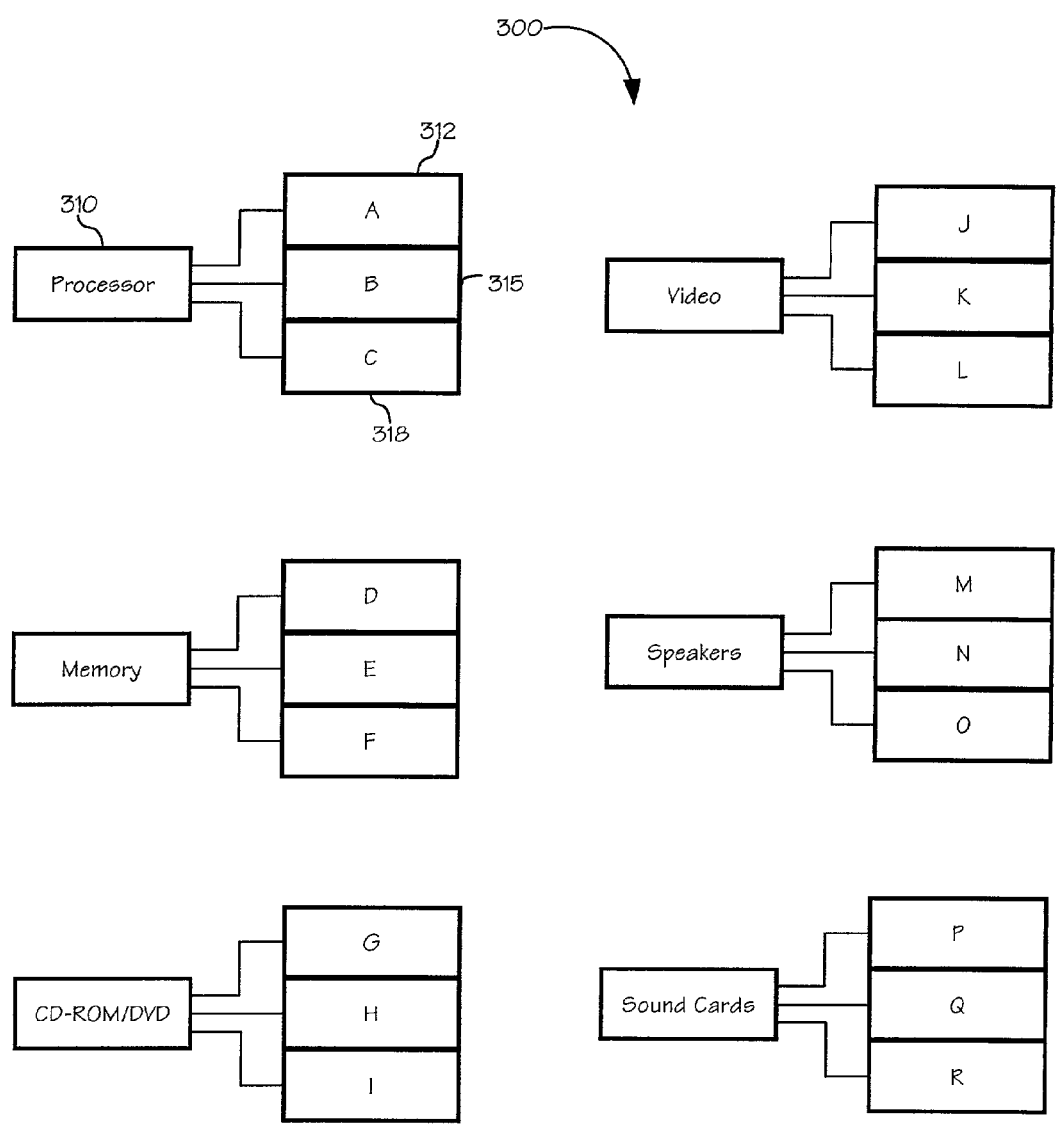
FIG. 3 depicts an embodiment of a display of a browsing interface of the present invention for presenting a list of products and features which may be included within a multi-component system.

Referring to FIG. 3, an embodiment of a display 300 of a browsing interface of the present invention presenting a list of components and products which may be included within a multi-component system is shown. In the embodiment as shown in FIG. 3, selections for a build-to-order computer system are provided and may be presented in an iconic form. This may allow a user to select desired components and products by engaging an icon of the desired component and product. For example, in an embodiment of the invention a selection may be accomplished by double clicking a mouse button while the cursor is placed above the icon. However, other methods of making a selection may be utilized by one of ordinary skill in the art without departing from the scope and spirit of the present invention.

In the embodiment as shown in FIG. 3, a computer system may require a processor 310. There may be three alternatives in the selection of a processor 310 for a build-to-order computer system. The first alternative, A 312 may be an upper end processor with a high processing clock speed, B 315 may be a middle end processor generally capable of meeting the requirements for most applications, and C 318 may be a low end, low cost model suitable for installation with low cost computers. In an embodiment of the invention, each alternative for each type of component and product available from a retailer may be presented in a graphical fashion to allow an easier method of selection along with the ability to provide additional information regarding each alternative.

Figure 4:
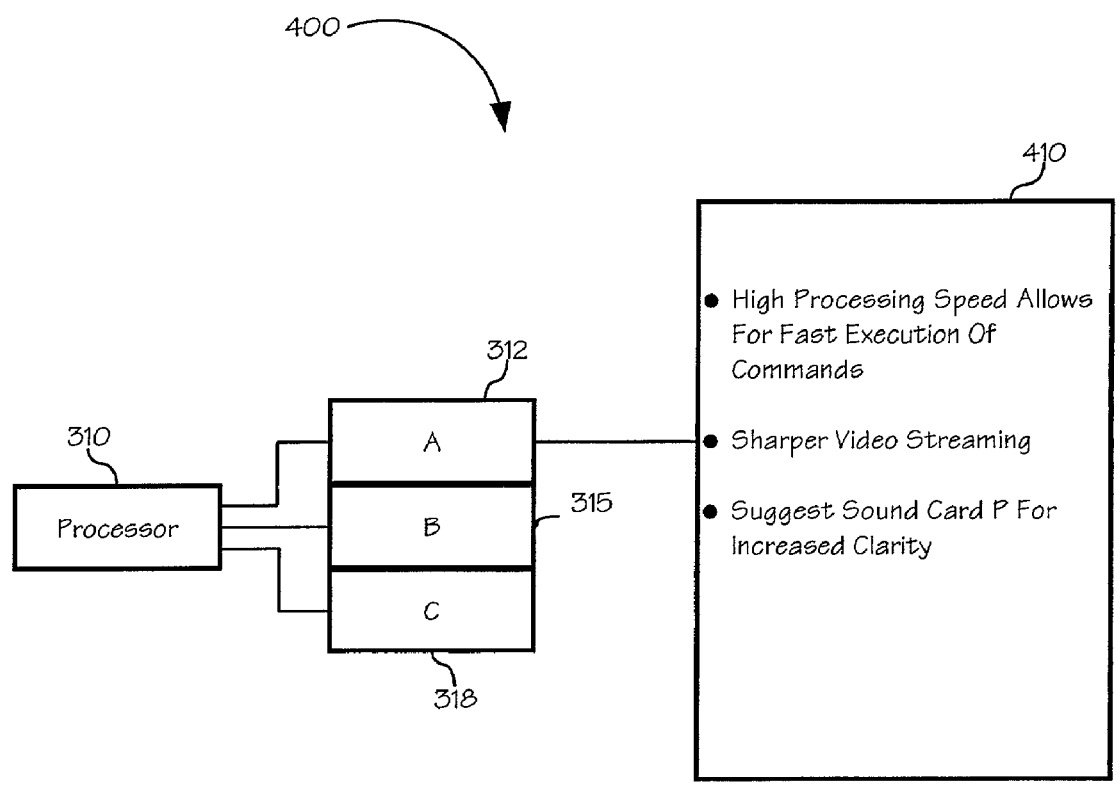
FIG. 4 depicts an embodiment of a display of a browsing interface equipped with a pop-up window of the present invention.

Referring now to FIG. 4, an embodiment of a display of a browsing interface 400 equipped with a pop-up window capable of providing instruction and support regarding a particular component is shown. The pop-up window of the present invention may also include information regarding the functionality of the selected system configuration. In the selection of a processor as shown in FIG. 3, a user may be presented with three types of processors. However, it may be difficult for the user to decide which type of processor he or she may require to meet his or her applications. Thus, in accordance with the present invention, a pop-up window 410 may appear while browsing a particular component and product. In an embodiment of the invention, the pop-up window may appear when an icon representing a particular product is engaged. For example, as the user moves a cursor above the icon for alternative A 312, additional information may be presented in a pop-up window 410. The information presented in a pop-up window may include information regarding the particular component and product and their specific advantages, suggestions for other components and products, or information regarding comparisons to prior selections.

Figure 5A:
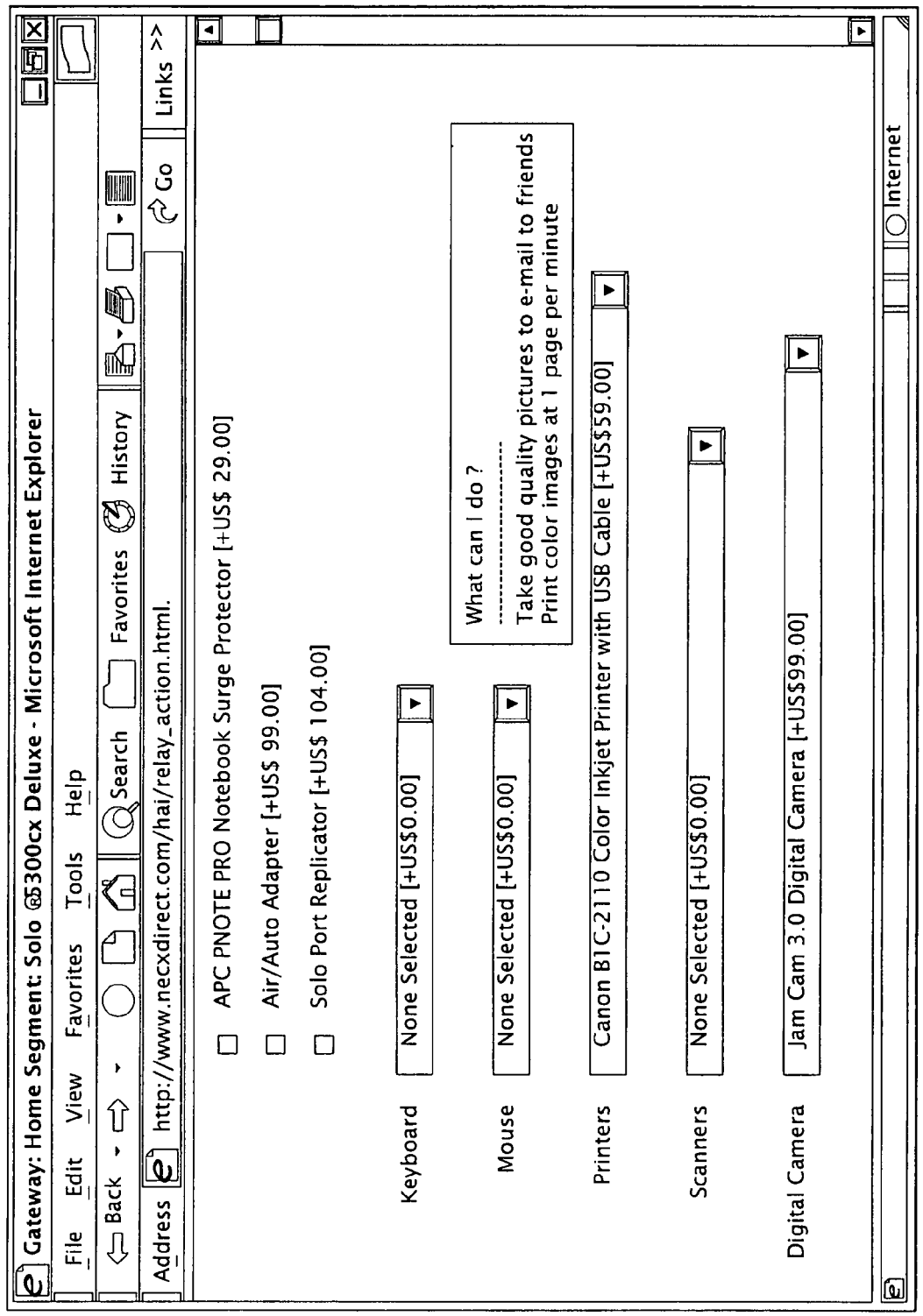
FIGS. 5A and 5B depict alternative embodiments of displays of the browsing interface of the present invention.
Figure 5B:
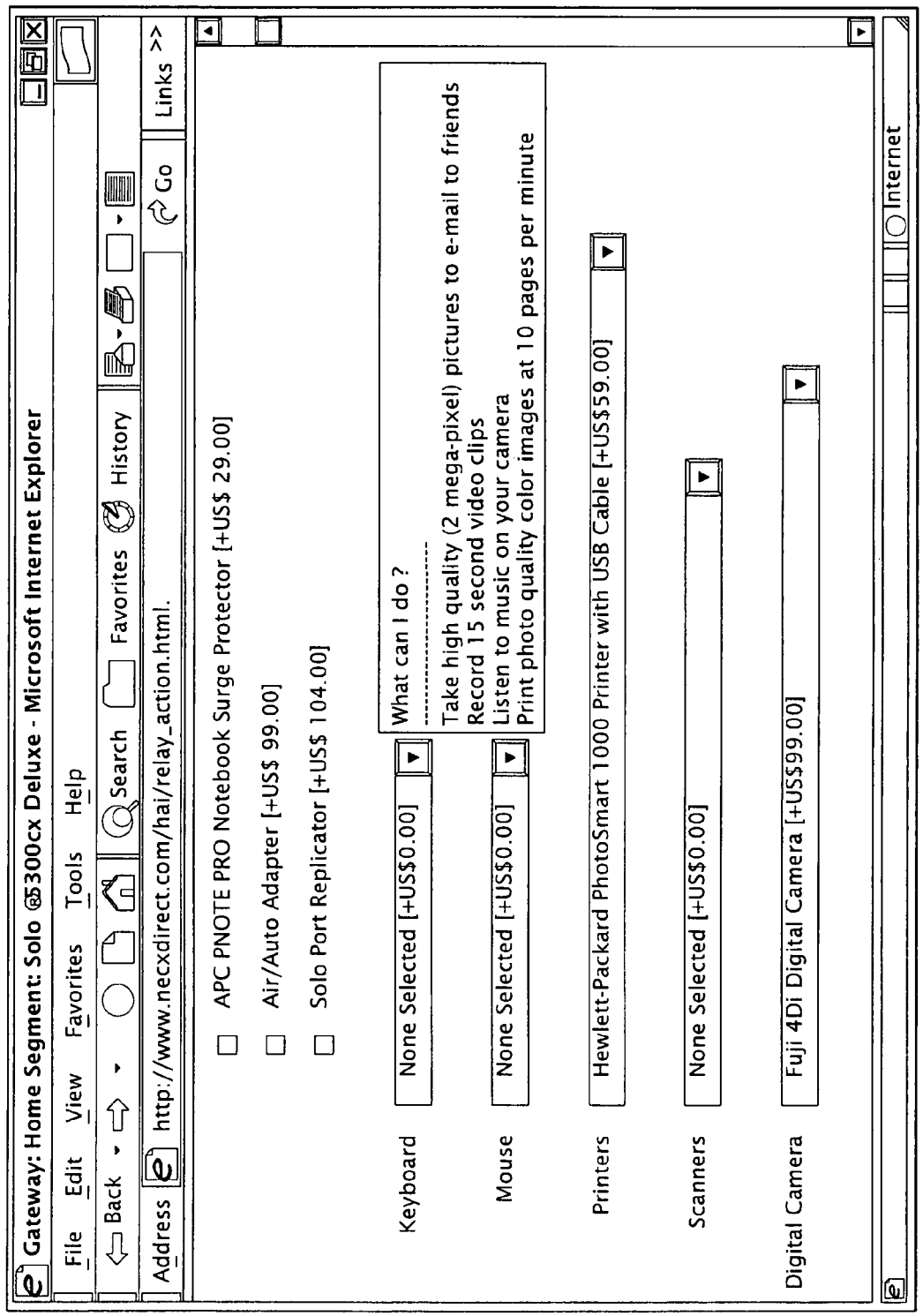

Referring now to FIGS. 5A and 5B, alternative embodiments of displays of the browsing interface of the present invention is shown. Referring specifically to FIG. 5A, a lower end model of a printer and a lower end model of a digital camera have been selected in the purchase of a build-to-order computer system. Based upon the user's selections of a lower end model of a printer and a lower end model of a digital camera, a window presenting information regarding the functionality of the system is presented. In FIG. 5B, a higher end model of a printer and a higher end model of a digital camera has been selected by a user. The browsing interface of the present invention may provide a description of the function capable of being implemented with the higher end selections. The content presented by the browsing interface of the present invention may inform the user regarding the advantages of a particular system configuration in order to allow the user to acquire a system that meets his or her needs.

Figure 6:
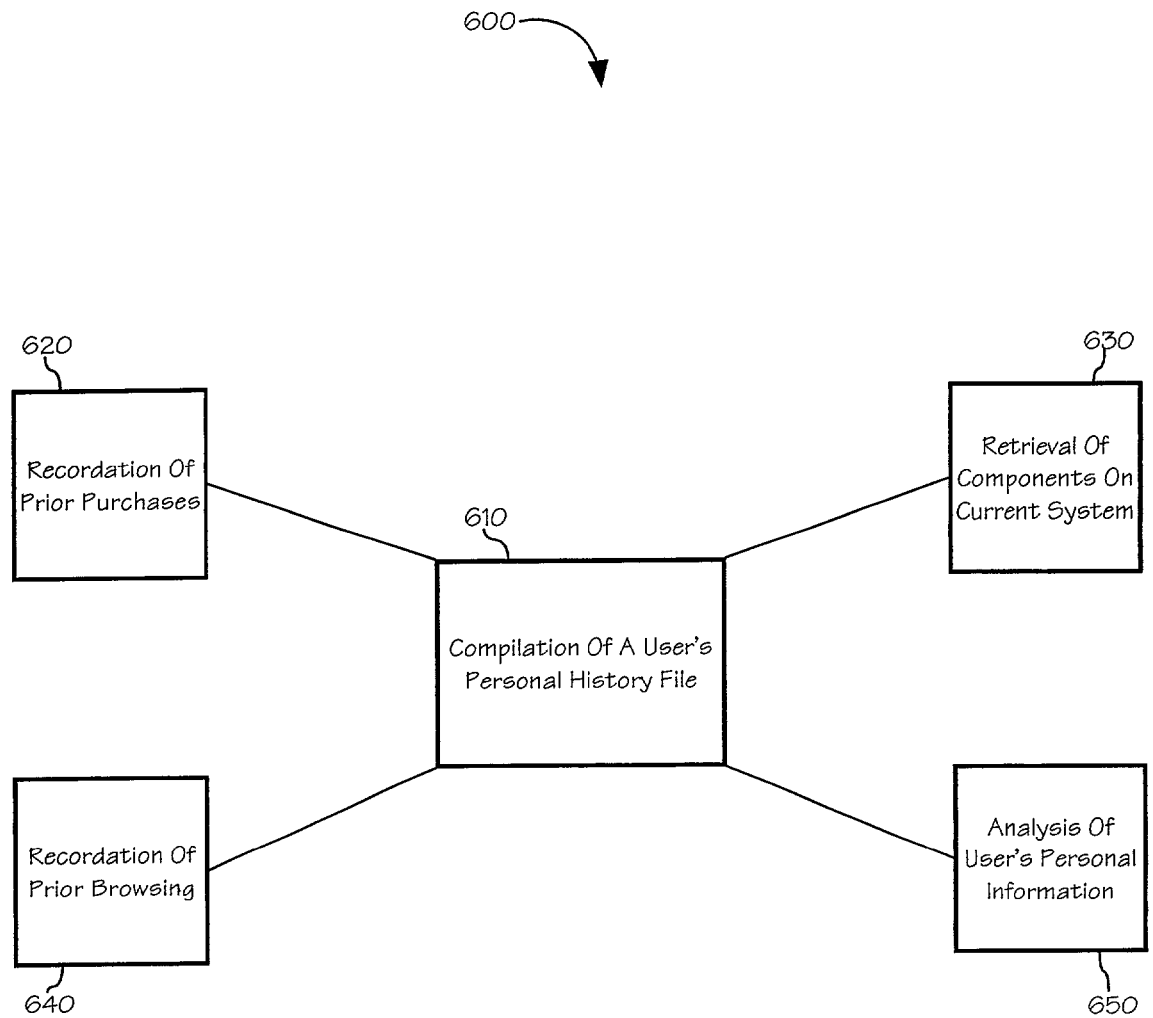
FIG. 6 depicts an embodiment of exemplary factors which may be analyzed to develop a personal history file in accordance with the present invention.

Referring now to FIG. 6, an embodiment of a system 600 for analyzing various exemplary factors for assembling a personal history file in accordance with the present invention is shown. In an embodiment of the invention, the browsing interface of the present invention may be capable of providing customized instruction and support regarding particular components and a combination of configuration choices of a system configuration. For example, upon gaining access to the browsing interface of the present invention, a user may be queried to provide a user identification. The browsing interface may be capable of compiling a user's personal history file 610. Upon an analysis of each file, the browsing interface may provide customized support for each user regarding the selection of components and products.

Each time a user may visit a retailer's browsing interface, he or she may be queried to enter their identification information. As a result, the database of the present invention may be capable of monitoring a user's current and prior visits to the browsing interface and other personal information. For example, the database may be capable of recording and storing a user's prior purchases 620. If a user has purchased games in the past and is browsing at games in a current visit, the database may be capable of suggesting games similar to the games a user has previously purchased. The database may also be capable of monitoring and recording the browsing of a user in prior visits 640. A history of each product and component which has been queried for additional information in prior visits may be recorded in order to determine a user's interests and desires.

In the example of a build-to-order computer system, a user history may be developed by an analysis of a user's current computer system and information appliance being utilized to access the interface 630. The interface of the present invention may query a user's information appliance and generate a graphical depiction of the configuration of the user's information appliance. The depiction of the configuration of the appliance may include the types of components present within the appliance along with model numbers, serial numbers, and the like. Upon an analysis of a user's current appliance, suggestions may include a comparison of new products and components to the user's current products and components.

Another method of creating a user's personal history file may include the analysis of a user's personal information 650. Upon a user's initial visit to the interface of the present invention, a user may be asked to provide personal information about himself or herself. For example, the user may be asked to provide information concerning gender, age range, income, mode of use of a product, and the like. The interface of the present invention may be capable of analyzing this information in order to provide a particular user with information that may be appropriate to a given user based upon the user's personal characteristics.

Figure 7:
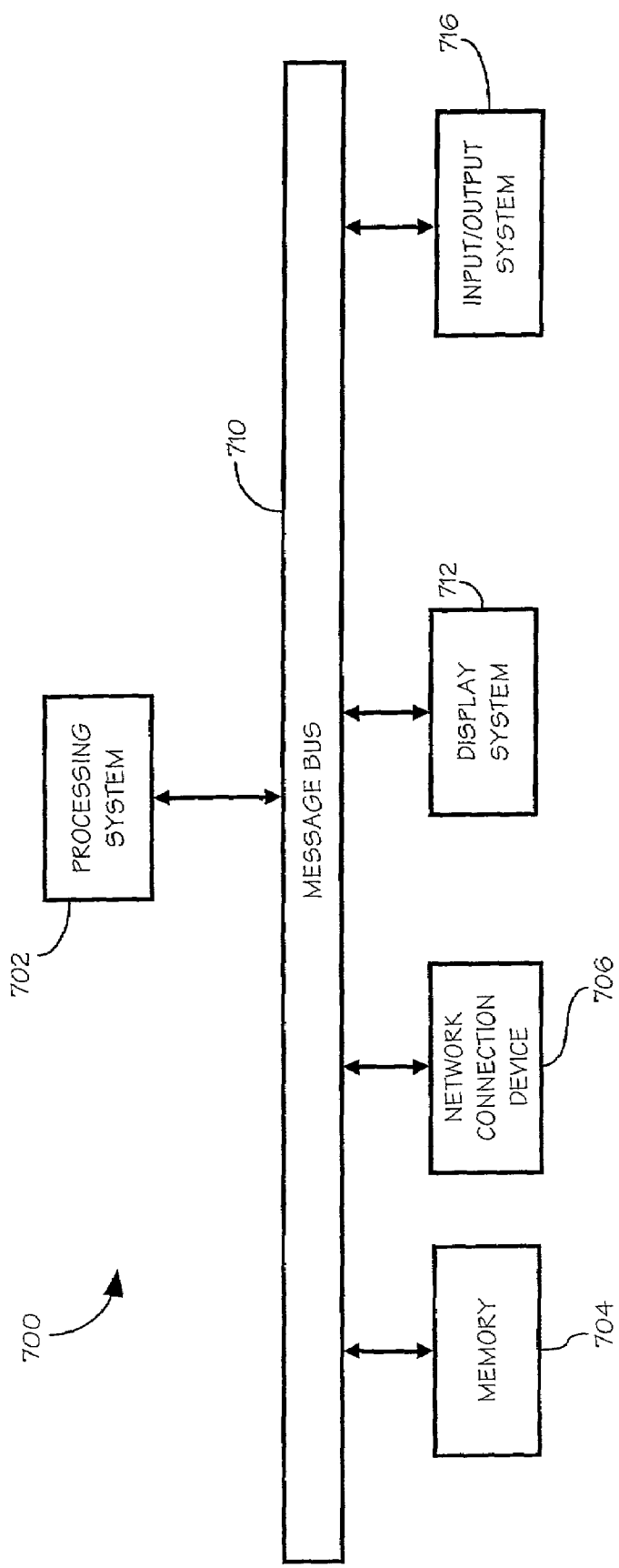
FIG. 7 depicts an embodiment of the hardware architecture of an information appliance of the present invention.

Referring now to FIG. 7, a hardware system for an information appliance 700 in accordance with the present invention is shown. Information appliance 700 may be representative of the information appliance 110 utilized to gain access to a world wide network as shown in FIG. 1. A controller, for example, a processing system 702, controls the information appliance 700. The processing system 702 includes a central processing unit such as a microprocessor or microcontroller for executing programs, performing data manipulations and controlling the tasks of the information appliance 700. Communication with the processing system 702 may be implemented through a message or system bus 710 for transferring information among the devices of the information appliance 700. The system bus 710 may include a data channel for facilitating information transfer between storage and other peripheral devices of the information appliance 700. The system bus 710 further provides the set of signals required for communication with processing system 702 including a data bus, address bus, and control bus. The system bus 710 may comprise any state of the art bus architecture according to promulgated standards, for example industry standard architecture (ISA), extended industry standard architecture (EISA), Micro Channel Architecture (MCA), peripheral device interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 710 may be compliant with any promulgated industry standard. For example, the system bus 710 may be designed in compliance with any of the following bus architectures: Industry Standard Architecture (ISA), Extended Industry Standard Architecture (EISA), Micro Channel Architecture, Peripheral Device Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), as examples.

Additionally, the information appliance 700 includes a memory 704. In one embodiment, memory 704 is provided on SIMMs (Single In-line Memory Modules), while in another embodiment, memory 704 is provided on DIMMs (Dual In-line Memory Modules), each of which plugs into suitable sockets provided on a motherboard holding many of the other devices shown in FIG. 7. Memory 704 includes standard DRAM (Dynamic Random-Access Memory), EDO (Extended Data Out) DRAM, SDRAM (Synchronous DRAM), or other suitable memory technology. Memory 704 may also include auxiliary memory to provide storage of instructions and data that are loaded into the memory 704 before execution. Auxiliary memory may include semiconductor-based memory such as read-only memory (ROM), programmable read-only memory (PROM) erasable programmable read-only memory (EPROM), electrically erasable read-only memory (EEPROM), or flash memory (block oriented memory similar to EEPROM).

The information appliance 700 may include a network connection device or a network interface 706. The network interface 706 communicates between the information appliance 700 and a remote device, such as external devices, networks, information sources, or host systems that administer a plurality of information appliances. For example, host systems such as a server or information appliance, may run software controlling the information appliance 700, serve as storage for an information appliance 700, or coordinate software running separately on each information appliance 700. The network interface 706 may provide or receive analog, digital, or radio frequency data. The network interface system 706 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and Universal Serial Bus (USB), as examples. For example, the network interface system 706 may comprise a network adapter, a serial port, parallel port, printer adapter, modem, universal asynchronous receiver-transmitter (UART) port, etc., or use various wireless technologies or links such as an infrared port, radio-frequency (RF) communications adapter, infrared transducers, or RF modem.

The information appliance 700 may preferably include a display system 712. This may allow for a generation of a display when an information appliance 700 is connected to a display device. The display system 712 may comprise a video display adapter having all of the devices for driving the display device 714, including video random access memory (VRAM), buffer, and graphics engine as desired. A display device may comprise a liquid-crystal display (LCD), or may comprise alternative display technologies, such as a light-emitting diode (LED) display, gas or plasma display, or employ flat-screen technology.

An information appliance 700 may further include an input/output (I/O) system 716. This may allow for user input via I/O devices when I/O devices are connected to information appliance 700. Input/output system 716 may comprise one or more controllers or adapters for providing interface functions between one or more I/O devices. For example, input/output system 716 may comprise a serial port, parallel port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. It should be appreciated that modification or reconfiguration of the information appliance 700 of FIG. 7 by a person of ordinary skill in the art would not depart from the scope or the spirit of the present invention.

Although the invention has been described with a certain degree of particularity, it should be recognized that elements thereof may be altered by persons skilled in the art without departing from the spirit and scope of the invention. It is believed that the method and system for the present invention and many of its attendant advantages will be understood by the foregoing description, and it will be apparent that various changes may be made in the form, construction, and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for configuring a build-to-order system using an information appliance to access a browsing interface via a world wide network, said method comprising:
   (a) providing a list of configuration choices presented in a graphical user interface displayed on an information appliance, said list comprising available system elements with which said build-to-order system are configured;
   (b) receiving a system configuration selection including a combination of at least two system elements of said available system elements selected from said list of configuration choices; and
   (c) providing a description of a function capable of being implemented with the combination of at least two system elements of said system configuration selection, said description of a function being dependent upon particular capabilities of the combination of said at least two system elements included in said system configuration selection.

2. The method as claimed in claim 1, further comprising the steps of:
   (a) receiving an updated system configuration selection; and
   (b) providing an updated description of a function capable of being implemented with said updated system configuration selection.

3. The method as claimed in claim 2, wherein the updated description of a function is changed from the description of a function that preceded the updated description based upon a difference in the updated system configuration selection with respect to a preceding system configuration selection.

4. The method as claimed in claim 1, wherein at least one of said available system elements in said list of configuration choices being represented by an icon.

5. The method as claimed in claim 1, further comprising the step of developing a personal user history tile for each user.

6. The method as claimed in claim 5, wherein said description of a function includes customized information pertaining to each user.

7. The method as claimed in claim 5, wherein said personal history file includes at least one of a list of prior purchases, a list of browsed products, a current component configuration, and user-provided personal characteristic information.

8. The method as claimed in claim 5, wherein said step of developing a personal user history file for each user includes obtaining information about each user's current products and components, wherein said description of function capable of being implemented with said system configuration selection includes comparison information regarding said selection and the user's current products and components.

9. The method as claimed in claim 1, wherein said description of function capable of being implemented with said system configuration selection includes at least one of advantages of said selection and suggestions for other selections.

10. The method as claimed in claim 1, further comprising providing, for at least two of said available system elements in said list, a sublist of optional alternatives for each of said at least two available system elements, said sublist of optional alternatives including devices of at least two different levels of capability or performance; and
    wherein said description of a function capable with the combination of at least two system elements is based upon the level of capability or performance of the optional alternatives selected from said sublist for each of said at least two available system elements.

11. A program of instructions embedded upon a medium capable of being read by an information appliance for causing an information appliance to implement steps for aiding a user in the selection of components for a build-to-order system, the steps comprising:
    (a) providing a list of configuration choices, said list comprising available system elements with which the system may be configured;
    (b) receiving a system configuration selection including a combination of at least two system elements of said available system elements selected from said list of configuration choices, said system configuration selection including a group of elements; and
    (c) providing a description of a function capable of being implemented with said system configuration selection including the group of components, said description of a function being dependent upon the combination of said at least two system elements included in said system configuration selection.

12. The program of instructions as claimed in claim 11, further comprising the steps of:
    (a) receiving an updated system configuration selection; and
    (b) providing an updated description of a function capable of being implemented with said updated system configuration selection.

13. The program of instructions as claimed in claim 11, wherein said list of configuration choices is presented in a graphical user interface.

14. The program of instructions as claimed in claim 11, wherein at least one of said available system elements in said list of configuration choices being represented by an icon.

15. The program of instructions claimed in claim 11, further comprising the step of developing a personal user history file for each user.

16. The program of instructions as claimed in claim 15, wherein said description of a function includes customized information pertaining to each user.

17. The program of instructions as claimed in claim 15, wherein said personal history file includes at least one of a list of prior purchases, a list of browsed products, a current component configuration, and user-provided personal characteristic information.

18. The program of instruction as claimed in claim 15, wherein said step of developing a personal user history file for each user includes obtaining information about each user's current products and components, wherein said description of a function capable of being implemented with said system configuration selection includes comparison information regarding said selection and the user's current products and components.

19. The program of instructions as claimed in claim 11, wherein said description of function capable of being implemented with said system configuration selection includes at least one of advantages of said selection and suggestions for other selections.

20. A system for aiding a user in the selection, of products for a build-to-order system, comprising:
    (a) means for providing a list of configuration choices, said list comprising available system elements with which said system may be configured;
    (b) means for receiving a system configuration selection including a combination of at least two system elements of said available system elements selected from said list of configuration choices; and (c) means for providing a description of a function capable, of being implemented with the combination of at least two system elements of said system configuration selection, said description of a function being dependent upon capabilities of the combination of said at least two system elements included in said system configuration selection.

21. The system as claimed in claim 20, further comprising:
   (a) means for receiving an updated system configuration selection; and
   (b) means for providing an updated description of a function capable of being implemented with said updated system configuration selection.

22. The system as claimed in claim 20, wherein said list of configuration choices is presented in a graphical user interface.

23. The system as claimed in claim 20, wherein at least one of said available system elements in said list of configuration choices being represented by an icon.

24. The system as claimed in claim 20, further comprising means for developing a personal user history file for each user.

25. The system as claimed in claim 24, wherein said description of a function includes customized information pertaining to each user.

26. The system as claimed in claim 24, wherein said personal history file includes at least one of a list of prior purchases, a list of browsed products, a current component configuration, and user-provided personal characteristic information.

27. The system as claimed in claim 24, wherein said personal history file for each user contains information about each user's current products and components, wherein said description of a function capable of being implemented with said system configuration selection includes comparison information regarding said selection and the user's current products and components.

28. The system as claimed in claim 20, wherein said description of function capable of being implemented with said system configuration selection includes at least one of advantages of said selection and suggestions for other selections.

29. A method far configuring a build-to-order system using an information appliance to access a browsing interface via a world wide network, said method comprising:
   (a) providing a list of configuration choices presented in a graphical user interface, said list comprising available system elements with which said build-to-order system are configured;
   (b) receiving a system configuration selection including a particular combination of at least two system elements of said available system elements selected from said list of configuration choices;
   (c) providing a description of a function capable of being implemented with the particular combination of said at least two system elements comprising said system configuration selection; and
   (d) upon receiving an updated system configuration selection, providing an updated and different description of a function capable of being implemented with said updated system configuration selection.

30. The method as claimed in claim 29, wherein the updated description of a function is changed from the description of a function that preceded the updated description based upon a difference in the updated system configuration selection with respect to a preceding system configuration selection.

* * * * *